Patented June 5, 1945

2,377,644

UNITED STATES PATENT OFFICE 2,377,644

TREATMENT OF EGG WHITES

Clinton H. Parsons and Leon D. Mink, Chicago, Ill., assignors to Industrial Patents Corporation, Chicago, Ill., a corporation of Delaware No Drawing. Application September 11, 1941, Serial No. 410,408

5 Claims. (Cl. 99—210)

This invention relates to a method of producing an improved egg white product, and more particularly it relates to a process of preparing a concentrated egg white product.

Natural liquid egg whites contain from 12% to 13% solids, the balance consisting essentially of water. For many purposes, particularly for confectionery uses, higher concentration of solids is desired. Furthermore, in transporting egg whites it is desirable to eliminate as large a part of the water as possible since the water adds appreciably to the cost of shipping and handling. To reduce such cost and to increase the scope of uses of egg whites, large quantities of these materials are concentrated by various processes, some of which have met with considerable commercial success. However, the concentrated products prepared by the usual processes are not readily reconstituted with water to uniform products of any desired solids content by the ultimate consumer. The solubility of the concentrated product varies substantially and the properties of the reconstituted products, such as viscosity, are materially altered. The egg white products in whole or in part are usually dried completely to a solid material which resists dissolution in water or in other egg white material.

Egg whites are very susceptible to denaturing by heat although the temperature may be maintained well below the coagulation temperature of the egg proteins. The conventional pan dried egg whites are necessarily subjected to heat for a comparatively long period of time and are therefore not readily reconstitutable. Although the solid dried egg product may be prepared by subjecting the liquid egg whites to a relatively low temperature, it has now been discovered that not only heat but also substantially complete desiccation, even when heated to lower temperatures, denatures the proteins present in the egg whites. Dried egg whites are not completely soluble in water since certain proportions of the material are rendered insoluble when completely dried. Dried egg products when reconstituted do not produce a liquid having the same viscosity as natural egg whites and do not foam in the same manner as liquid egg whites, particularly for baking purposes.

It has also been discovered that a concentrated egg white product possessing all their original valuable properties of solubility, viscosity, emulsibility, etc., may be prepared by a carefully controlled evaporation of only a portion, preferably at least 50%, but not more than 90%, of the water content of the liquid egg whites. The product of this invention is readily reconstitutable to form a product more nearly comparable to natural liquid egg whites, both in viscosity and other characteristics than previously obtainable. Products, prepared in accordance with this invention, containing from 25% to as high as 60% solids may be reconstituted to the original solids basis and will possess about the same viscosity and other characteristics as natural liquid egg whites. The reconstituted product, when employed in making cakes, more nearly approaches the product of natural liquid egg whites than do those comprising completely dried egg white product entirely or in part, such as described in Epstein et al., United States Patent No. 1,818,215.

In one method of practicing this invention, the natural liquid egg whites are placed in pans and subjected to temperatures below the coagulation temperature of normal egg whites in a wind tunnel type of drier. Between 135° and 140° F. may be maintained in reducing the moisture content of the liquid egg whites to produce products having a solids content of from 25% to as high as 60%. A very satisfactory product may be obtained by reducing the water content of the liquid egg whites so that the product contains about 45% solids. During the heat treatment, a leathery skin-like surface is often formed. After the desired quantity of water is evaporated from the material, the mixture is held at a temperature of from 45° to 50° F. for from 12 to 14 hours to allow the material to assume a wholly uniform viscous consistency. During this period the leathery skin-like surface assumes a liquid state.

The concentrated egg white product may then be stored or held in refrigerator temperatures for an indefinite period. The product may be stored in a frozen condition. If it is desired to store the product at ordinary or room temperatures, suitable quantities of sugar, for example from 30% to 40% sugar, may be added to the concentrated product. It is also within the scope of this invention to incorporate other materials in the concentrated liquid egg white product, such as flavoring agents, coloring agents, stabilizing agents, emulsifying and wetting agents, and/or the like. Among such materials are fatty acid monoglycerides, fatty acid alkylolamides, long chain alcohol sulphate salts, alkylated aromatic sulphonate salts, essential oil, sodium chloride and/or the like.

The limited heat treatment to which the egg whites are subjected in reducing the water content does not appear to have any substantial deleterious effect upon the proteins. The product is substantially completely soluble in water, that is, it is soluble in water to the same extent as natural liquid egg whites. The product may be readily reconstituted to any desired solids content and furnishes a convenient and excellent substitute for natural liquid egg whites for all purposes.

This product is of particular utility to confectioners who generally experience considerable difficulties when using normal or natural egg whites.

The following example is given for the purpose of illustrating the present invention, but is not intended to be limiting on the scope thereof.

*Example*

A quantity of liquid egg whites is thoroughly mixed so that a uniform liquid product is obtained. From this material three samples are taken, one is preserved as a normal liquid egg white, one sample is concentrated by partial evaporation of moisture, and the other sample is substantially completely dried in accordance with conventional pan drying methods. In preparing the concentrated liquid egg white and the solid dried egg white, a temperature of 134° F. is employed. The liquid egg white product is concentrated only until the solution contains approximately 35.3% solids, whereas the solid product is substantially completely dried. The concentrated liquid product and the solid dried product are reconstituted to the original solids basis. The solid dried egg material is soaked in water for about two and one-half hours for regeneration, whereas the concentrated liquid egg white requires only a few minutes. The viscosity of the reconstituted concentrated liquid egg white solution is substantially the same as that of the untreated material, but the viscosity of the reconstituted solid dried material is substantially less than the other two. The three samples are then subjected to whipping and cake baking tests.

Each of the samples is whipped in the same beater and under the same conditions. The volume of the cakes produced from liquid egg whites and the concentrated egg whites is about the same, but the volume of the cakes baked from batter containing the pan dried egg whites is considerably smaller. The texture and tenderness of the cakes baked from batter containing normal liquid egg whites and concentrated liquid egg whites is about the same, whereas the cakes made from batter containing solid pan dried egg whites possess a much more compact texture and appear to be somewhat tough.

The following table represents the data on the specific gravity, whipping and baking tests:

|  | Whipping time | Specific gravity wet peak | Total whipping time | Specific gravity | |
| --- | --- | --- | --- | --- | --- |
|  |  |  |  | Foam + sugar | Batter |
| Normal liquid whites | *Minutes* 4 | .140 | *Minutes* 5½ | .150 | .315 |
| Concentrated liquid whites | 5 | .160 | 10 | .165 | .325 |
| Pan dried solid whites (very wet batter) | 5 | .165 | 10 | .170 | .350 |

Although the above-described pan concentrating method is particularly suitable for partially drying the egg whites to a concentrated liquid condition, other methods of concentrating, e. g. limited foam drying, may similarly be employed if care is taken to avoid heating the egg white material above a temperature of about 145° F. (preferably between 130° F. and 140° F.) and also to prevent dehydration beyond about 90% total water; that is, a product of about 60% solids. Above that concentration there is a definite tendency to alter the properties of the egg white material.

As many widely different modifications and embodiments of the invention hereinbefore set forth may be made without departing from the spirit and scope thereof, only such limitations should be imposed as are indicated in the following claims.

We claim:

1. The method of preparing a concentrated liquid egg white which comprises subjecting the liquid egg whites to a temperature of from 130° F. to 140° F. for a sufficient period of time to remove not more than 90% of the water whereby a leathery skin-like surface is formed on the product and maintaining the concentrated material at a temperature of from 45° to 50° F. for about 12 to 14 hours to produce a uniformly viscous consistency.

2. The method of preparing a concentrated liquid egg white, which comprises removing at least 50 per cent but not more than 90 per cent of the water in the liquid egg white by evaporation at a temperature of from 130° F. to 140° F., maintaining the concentrated material at a temperature of from 45° F. to 50° F. for a period of at least 12 to 14 hours to temper and produce a uniformly viscous consistency in the product.

3. The method of preparing concentrated liquid egg white, which comprises removing water from the liquid egg white by evaporation at a temperature of from 130° F. to 140° F. until the solid content is at least 25 per cent but not more than 60 per cent, whereby a leathery, skin-like surface is formed on the product, maintaining the concentrated material below room temperature but above freezing temperature for a period of at least 12 to 14 hours to temper and produce a uniformly viscous consistency and then freezing the product.

4. The method of preparing a concentrated liquid egg white, which comprises subjecting the liquid egg whites to a temperature of from 130° F. to 140° F. for a sufficient period of time to remove not more than 90 per cent of the water whereby a leathery skin-like surface is formed on the product, and thereafter maintaining the concentrated material at about 45° F. to 50° F. for a sufficient period of time to temper and produce a uniformly viscous consistency in the product and for an insufficient period of time to cause deterioration.

5. The method of preparing a concentrated liquid egg white, which comprises subjecting the liquid egg white to a temperature of from 130° F. to 140° F. for a sufficient period of time to remove not more than 90 per cent of the water, whereby a leathery, skin-like surface is formed on the product, thereafter maintaining the concentrated material below room temperature but above freezing temperature for a period of at least 12 to 14 hours to temper and produce a uniformly viscous consistency in the product, thereafter incorporating in the product from 30 to 40 per cent sugar and storing the product at room temperatures.

CLINTON H. PARSONS.
LEON D. MINK.